(12) United States Patent
Wang et al.

(10) Patent No.: US 8,481,126 B2
(45) Date of Patent: Jul. 9, 2013

(54) METHOD FOR FABRICATING DEVICE HOUSING HAVING CERAMIC COATING

(75) Inventors: Ren-Bo Wang, Shenzhen (CN); Xin-Wu Guan, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/340,710

(22) Filed: Dec. 30, 2011

(65) Prior Publication Data
US 2013/0087952 A1   Apr. 11, 2013

(30) Foreign Application Priority Data
Oct. 10, 2011   (CN) .................. 2011 1 0304370

(51) Int. Cl.
*B05D 1/06* (2006.01)
*B05D 3/02* (2006.01)
*B05D 3/06* (2006.01)

(52) U.S. Cl.
USPC ......... 427/475; 427/190; 427/374.1; 427/556

(58) Field of Classification Search
USPC ................. 427/475, 556, 374.1, 190
See application file for complete search history.

(56) References Cited

U.S. PATENT DOCUMENTS

| | | | |
|---|---|---|---|
| 7,687,105 B2* | 3/2010 | Spitsberg et al. | 427/201 |
| 2004/0247903 A1* | 12/2004 | Axen et al. | 428/469 |
| 2008/0131621 A1* | 6/2008 | Lineton et al. | 427/556 |
| 2009/0162561 A1* | 6/2009 | Kirby et al. | 427/452 |
| 2010/0129639 A1* | 5/2010 | Icoz et al. | 428/317.9 |

\* cited by examiner

*Primary Examiner* — Frederick Parker
(74) *Attorney, Agent, or Firm* — Altis Law Group, Inc.

(57) ABSTRACT

A method for making a housing of an electronic device includes applying a layer of ceramic powder material to an outer surface of a metal substrate. The layer of ceramic powder material and a top layer of the metal substrate are melted by laser irradiation, forming a ceramic-metal composite coating integrally bonding with the metal substrate when cooled. The substrate with the ceramic-metal composite coating is heated to a peak temperature, maintained at the peak temperature for a desired period of time, and then cooled down to room temperature. The heat treated metal substrate with the ceramic-metal composite coating is then formed into a desired shape.

15 Claims, 2 Drawing Sheets

METHOD FOR FABRICATING DEVICE HOUSING HAVING CERAMIC COATING

BACKGROUND

1. Technical Field

The present disclosure relates to a method for fabricating device housings coated with ceramic coatings.

2. Description of Related Art

Metals such as stainless steel, aluminum alloy, magnesium alloy, or titanium alloy, are usually used as shells of portable electronic devices such as MP3 players and mobile phones.

Metal shells having ceramic coatings can be wear-resistant and attractive. A typical method for fabricating the metal shells includes forming a 3D shaped shell substrate, spraying a ceramic powder coating on the 3D shaped shell substrate, and melting the ceramic powder coating by laser irradiation of a laser. However, a special bracket is needed to mount and rotate the shell substrate relative to the laser about multiple axes to coat each and every portion of the shell substrate. Accordingly, the fabricating cost is high.

Therefore, there is room for improvement within the art.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure. Moreover, in the drawings like reference numerals designate corresponding parts throughout the views.

DETAILED DESCRIPTION

Figure 1:
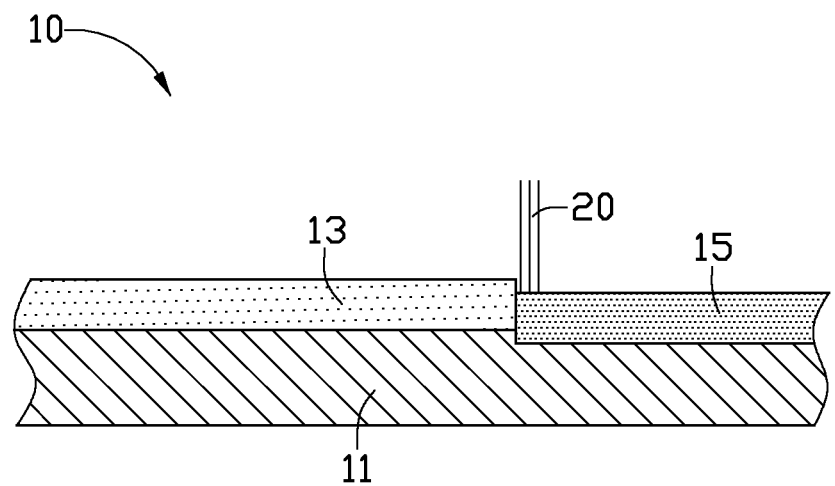
FIG. 1 is a schematic view showing one embodiment of a manufacturing process in the method of melting a ceramic powder coating on the metal substrate by laser irradiation.
Figure 2:
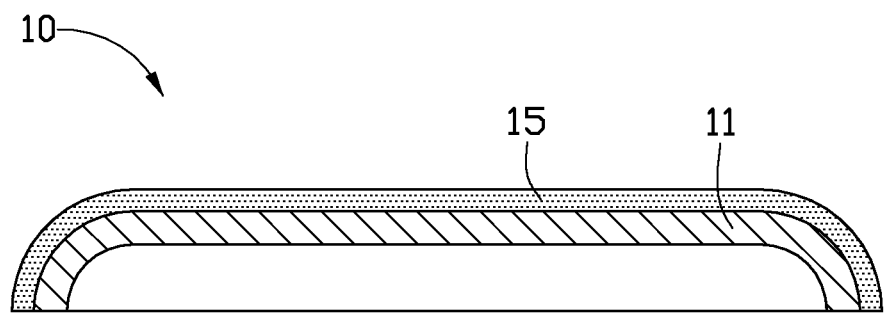
FIG. 2 is a schematic cross-section view of one embodiment of a device housing.

FIGS. 1 and 2 show one embodiment of a method for fabricating a device housing 10 coated with a ceramic coating. The method includes the following steps.

A metal substrate 11 is provided. The substrate 11 can be made of stainless steel or aluminum alloy. The metal substrate 11 can be a metal board or metal sheet.

The substrate 11 can be pretreated. The pretreatment can include cleaning the substrate 11 with an organic solution (e.g., alcohol or acetone) in an ultrasonic cleaner, to remove impurities such as grease or dirt from the substrate 11. An outer surface of the substrate 11 can be roughened by sandblasting after being grounded and polished to achieve a level surface. The roughened outer surface can achieve a roughness (Ra) of about 1.3 micrometers ($\mu m$) to about 2.0 $\mu m$.

A layer 13 of ceramic powder material is applied to the outer surface by electrostatic powder spraying, for example. The ceramic powder material can be oxide ceramic, such as vanadium oxide, aluminum oxide, zirconium oxide, ferroferric oxide, or titanium oxide. The ceramic powder material can also be carbide ceramic, such as tungsten carbide and silicon carbide, or nitride ceramic, such as titanium nitride and aluminum nitride. The ceramic powder material has an average particle diameter of about 10 $\mu m$-30 $\mu m$. The thickness of the layer 13 of ceramic powder material may be about 0.03 millimeters (mm) to about 0.08 mm.

The layer 13 of ceramic powder material and a top layer of the substrate 11 may be melted by irradiation from a laser beam 20, forming a ceramic-metal composite coating 15 integrally bonding with the substrate 11 when cooled. The ceramic powder material is preferably opaque ceramic, which can absorb more laser irradiation energy and easily melt than transparent and translucent ceramic. The ceramic-metal composite coating 15 may have a thickness of about 0.2 mm to about 1.0 mm.

The substrate 11 is then processed by heating the substrate 11 with the ceramic-metal composite coating 15 to a peak temperature, maintaining the peak temperature for a period of time, and then cooling down the substrate 11 with the ceramic-metal composite coating 15 to room temperature. In one embodiment, the heat treatment may be carried out as follows. The substrate 11 with the ceramic-metal composite coating 15 is heated from about 0 degrees centigrade (° C.) to about 900° C. within about 30 minutes (min) to about 50 min, and maintained at about 900° C. for about 60 min to about 120 min The substrate 11 is then cooled down to room temperature at an average cooling rate of no more than 5° C./min. In this embodiment, the substrate 11 is cooled down from about 900° C. to about 600° C. within about 30 min to about 60 min, from about 600° C. to about 200° C. within about 80 min to about 150 min, and from about 200° C. to room temperature by natural cooling. The heat treatment relieves stress between the ceramic-metal composite coating 15 and the substrate 11 due to a temperature difference between the substrate 11 and the melted layer 13 of ceramic powder material during the laser irradiation process. Thus, the bonding between the substrate 11 and the ceramic-metal composite coating 15 can be improved.

The peak temperature and the period of time for maintaining the peak temperature and may be adjusted according to the materials and sizes of the substrate 11 and the ceramic powder.

FIG. 2, is one embodiment of the heat treated substrate 11 with the ceramic-metal composite coating 15 formed into a desired shape by stamping, machining, or other mechanical means, for example.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making a device housing having a ceramic coating, comprising:
   providing a metal substrate;
   applying a layer of powder material to an outer surface of the metal substrate, the powder material consisting of ceramic powder material;
   melting the layer of ceramic powder material and a top layer of the metal substrate by laser irradiation, thereby forming a ceramic-metal composite coating integrally bonding with the metal substrate;
   applying a heat treatment by heating the metal substrate with the ceramic-metal composite coating to a peak temperature and maintaining the metal substrate with the ceramic-metal composite coating at the peak temperature for a period of time to relieve stress between the ceramic-metal composite coating and the metal substrate;

cooling the metal substrate with the ceramic-metal composite coating from the peak temperature to room temperature; and forming the metal substrate with the ceramic-metal composite coating into a desired shape.

2. The method as claimed in claim 1, wherein the metal substrate is made of stainless steel or aluminum alloy.

3. The method as claimed in claim 1, wherein the layer of ceramic powder material is applied by electrostatic powder spraying.

4. The method as claimed in claim 1, wherein the ceramic powder material is oxide ceramic.

5. The method as claimed in claim 4, wherein the ceramic powder material is selected from the group consisting of vanadium oxide, aluminum oxide, zirconium oxide, ferroferric oxide, titanium oxide, and any combination thereof.

6. The method as claimed in claim 1, wherein the ceramic powder material is carbide ceramic.

7. The method as claimed in claim 6, wherein the ceramic powder material is tungsten carbide or silicon carbide.

8. The method as claimed in claim 1, wherein the ceramic powder material is nitride ceramic.

9. The method as claimed in claim 8, wherein the ceramic powder material is titanium nitride or aluminum nitride.

10. The method as claimed in claim 1, wherein the layer of ceramic powder material has an average particle diameter of about 10 μm to about 30 μm.

11. The method as claimed in claim 1, wherein the thickness of the layer of ceramic powder material is about 0.03 mm to about 0.08 mm.

12. The method as claimed in claim 1, wherein during the heat treatment, the metal substrate with the ceramic-metal composite coating is heated from about 0° C. to about 900° C. within about 30 min to about 50 min, maintained at about 900° C. for about 60 min to about 120 min, and then cooled down to room temperature at an average cooling rate of no more than 5° C./min.

13. The method as claimed in claim 12, wherein the metal substrate is cooled down from about 900° C. to about 600° C. within about 30 min to about 60 min, from about 600° C. to about 200° C. within about 80 min to about 150 min, and from about 200° C. to room temperature by natural cooling.

14. The method as claimed in claim 1, further comprising a step of roughing the outer surface of the metal substrate by sandblasting, achieving a roughness of about 1.3 μm to about 2.0 μm, before applying the layer of ceramic powder material.

15. The method as claimed in claim 4, wherein the ceramic powder material consists of at least one oxide ceramic selected from the group consisting of vanadium oxide, aluminum oxide, zirconium oxide, ferroferric oxide, titanium oxide, and any combination thereof.

\* \* \* \* \*